Feb. 6, 1951 W. A. KLEIN ET AL 2,540,986
APPARATUS FOR PRESHRINKING CRYSTALLINE VINYLIDENE
CHLORIDE COPOLYMER FILM
Filed Aug. 1, 1949 2 Sheets-Sheet 1
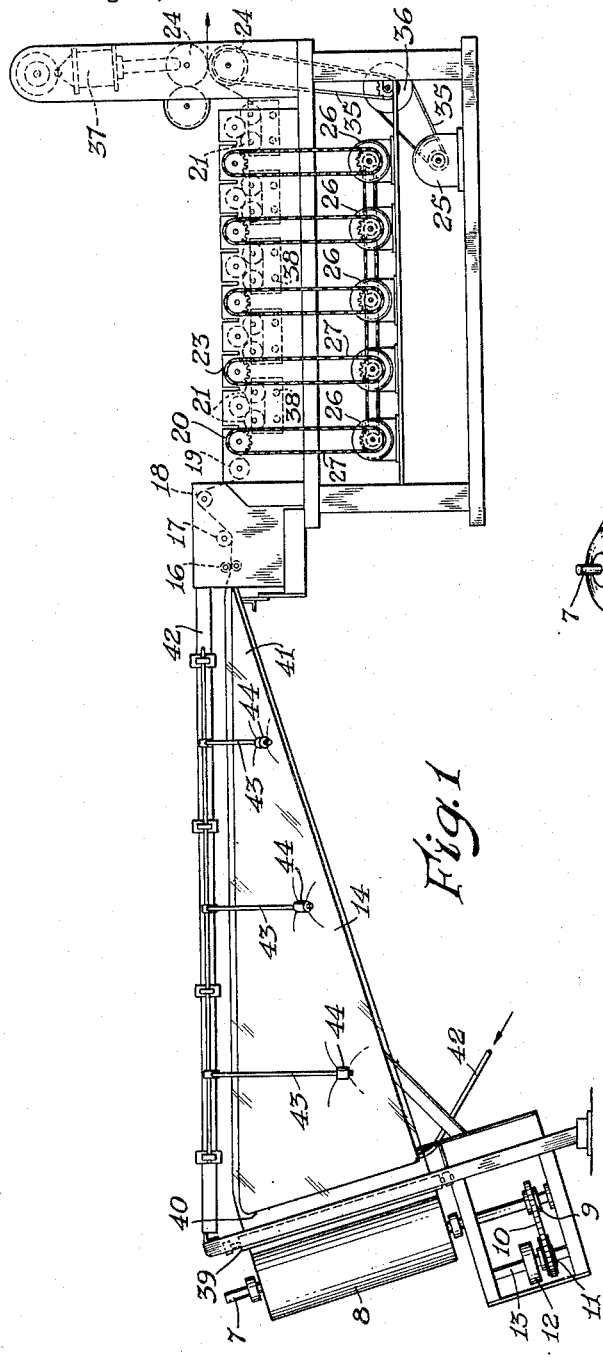
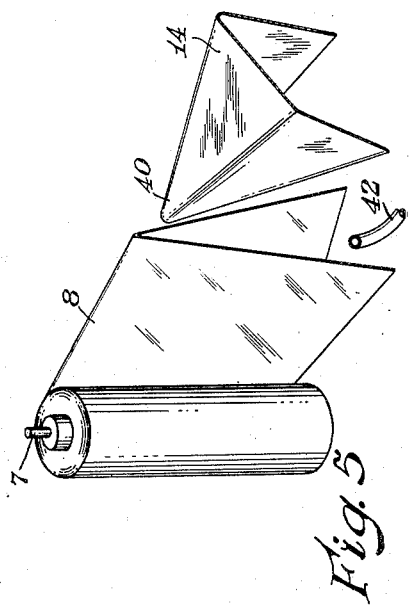
INVENTORS.
Walter A. Klein
Robert R. Trull
Edward V. Dettmer
BY Griswold & Burdick
ATTORNEYS

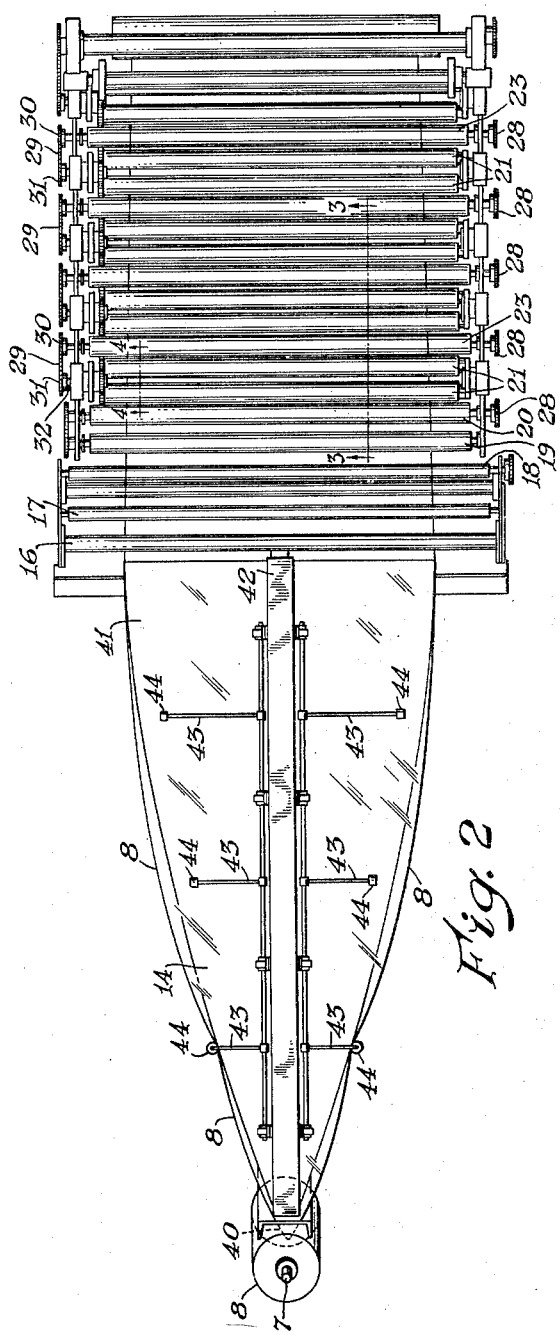

Patented Feb. 6, 1951

2,540,986

UNITED STATES PATENT OFFICE 2,540,986

APPARATUS FOR PRESHRINKING CRYSTALLINE VINYLIDENE CHLORIDE COPOLYMER FILM

Walter A. Klein and Robert R. Trull, Midland, and Edward V. Dettmer, Bay City, Mich., assignors to The Dow Chemical Company, Midland, Mich., a corporation of Delaware Application August 1, 1949, Serial No. 108,006

1 Claim. (Cl. 18—1)

This invention relates to apparatus for preshrinking crystalline vinylidene chloride copolymer film. It relates in particular to an apparatus adapted to render such film substantially resistant to shrinkage upon exposure to temperatures from 140° up to 212° F.

It has been shown by Wiley, in U. S. Patent No. 2,233,442, that those copolymers of vinylidene chloride which contain up to 20 per cent or so of a copolymerized monoethylenically unsaturated monomer are often crystalline, as determined by the X-ray diffraction patterns of such copolymers. It has also been shown that such normally crystalline copolymers of vinylidene chloride may be formed into useful oriented crystalline articles by a process including the successive steps of melting the copolymer, shaping it, cooling it rapidly to a temporarily non-crystalline, supercooled state, and cold-stretching the supercooled article. These properties have been utilized commercially in the production of strong, moisture-impervious flexible films by the process described by Stephenson in U. S. Patent No. 2,452,080. In the latter process, the copolymer is melted and extruded downwardly through a tube-forming orifice into a cold water bath, where it is supercooled. The supercooled tube is withdrawn from the bath and is inflated with air to effect a 3- to 5-fold radial distension and a 2- to 4-fold longitudinal stretch. The resulting oriented crystalline film may be used in its tubular form or it may be slit and opened to produce a flat film.

The film resulting from Stephenson's process is a useful article of commerce on account of its high tensile strength in both principal directions, its flexibility, and especially because of its extreme resistance to permeability by water, water vapor and other liquids and vapors. It is used extensively for wrapping foods and other materials where it is desired either to retain moisture in or to exclude it from the wrapped article.

It has been observed that the oriented crystalline vinylidene chloride copolymer films discussed above have a tendency to shrink irregularly on standing at room temperature, even when under the tension existing in tightly wound rolls of the film in storage. Such wound films tend to shrink laterally, producing an irregular wrinkle effect in the film when it is subsequently unwound for use. The retraction which occurs on standing, coupled with the different degrees of stretching of the film radially and longitudinally during its production, gives a film with highly irregular and unpredictable shrinkage characteristics when subjected to elevated temperatures. It is common experience to find that oriented films shrink when heated, and, when such shrinkage is regular and uniform it is used to advantage in certain types of packaging operations. On the other hand, if a film shrinks irregularly when exposed to heat, it cannot be used successfully to produce neatly packaged articles whenever a heat-seal is required in the wrapping operation. The welding of superposed layers of a thermally unstable film causes unsightly wrinkles and uneven tensions along the weld line. Various thermal treatments have been proposed for preshrinking oriented films so as to avoid or minimize these difficulties, but none has had sufficient manipulative flexibility to be practical. Laborious tests on small pieces of film have shown that, if the film can be processed in such a manner that subsequent exposure for about 10 minutes to temperatures up to 100° C. results in no more than 5 per cent shrinkage, the stated problems are avoided and the product is acceptable for the most exacting uses.

It has been found by Robert D. Lowry and Hugo L. Schaefer that oriented crystalline vinylidene chloride copolymer film may be rendered substantially resistant to shrinkage upon subsequent exposure to temperatures up to 212° F. by a method which is disclosed in their application for U. S. Letters Patent Serial No. 107,958, filed concurrently herewith. The method disclosed in said application comprises exposing the oriented film successively to a series of elevated temperatures while passing over at least four non-contiguous heated rollers. In a preferred embodiment of the method, the first such roller may have a temperature between room temperature and 220° F. and the last such roller is at a temperature from room temperature up to 240° F. while the intermediate rollers are at temperatures of at least 200° F. and may be as hot as 265° F. It is also disclosed in the concurrently filed application of Robert D. Lowry and Hugo L. Schaefer that the rate of advance of the film over the various heated surfaces should be so adjusted as to provide a contact time between the film and said surfaces of from 1.5 to 20 seconds.

It is an object of the present invention to provide an apparatus particularly adapted for preshrinking an oriented crystalline vinylidene chloride copolymer film somewhat in accordance with the method disclosed in the above-identified concurrently filed application of Robert D. Lowry and Hugo L. Schaefer. A particular object is to provide such an apparatus to which the film may be supplied in essentially wrinkle-free condition and in which the film may be exposed to graduated temperatures while being kept under sufficient tension to prevent wrinkling. It is a special object of the invention to provide such an apparatus wherein the heat treatment of the crystalline film may be effected through contact between the film and a heated inert liquid. Other and related objects may appear hereinafter.

We have now developed an apparatus capable of accomplishing the foregoing objects and in which the method previously described may be carried out. The apparatus comprises a tank containing a series of at least four compartments or troughs disposed transversely to the direction of flow of film through the machine. The width of the tank, i. e., the length of each compartment, is greater than the maximum width of any film to be treated so that each film being passed through the machine may be maintained in a flat rather than in a folded condition. Each compartment is filled with a liquid which is inert to the vinylidene chloride copolymer film. Examples of such liquids are water, ethylene glycol, glycerine, mineral oil and the like. The choice of a particular liquid will depend largely on the temperature which is desired to be maintained during the treatment. A highly polished smooth cylindrical roller is positioned to dip beneath the surface of the liquid in each of the several compartments of the machine and is disposed with its axis transverse to the direction of travel of film through the machine. Another highly polished steel roller of a somewhat greater length is mounted above each end of the multiple compartment tank and one such roller is mounted above each of the partitions between the various compartments. Each of the latter group of rollers is provided with an individual drive mechanism so that each may be driven at an independently selected speed. A means is provided in each compartment for heating the liquid therein to an independently controlled temperature. In order to remove any liquid transported from the last compartment by the film treated therein, there is positioned beyond said compartment in the line of travel of film a pair of compressible squeeze rollers which are suitably rubber covered. These rollers have a separately controlled drive mechanism and are caused to rotate at a rate sufficient to maintain enough tension on the film being treated to draw it through the apparatus and to keep it free from wrinkles while being fed to a conventional slitter or winder.

Film produced by the method of the previously mentioned Stephenson patent is obtained conventionally in the form of a continuous tube. In order to produce film of maximum width from such a tube, it is the practice to flatten the tube and to cut away one edge of the resulting sheet of double thickness. This provides a folded film which forms a suitable feed to the apparatus of the present invention. When using such a folded film, however, it is necessary to provide a means for opening and spreading the film conveniently and for delivering it in a flat and essentially wrinkle-free condition to the series of rollers mentioned above. For this purpose a desirable element for use with the present apparatus is a spreader over which the folded film may be drawn in such a manner that it leaves the spreader at its full width. The spreader may best be described as having a pointed prow continuous with a broad and relatively flat body portion. (The word "prow" is here used in a broad sense to indicate the shape of the converging forward walls of a vessel, rather than to indicate narrowly only the stem of a boat-shaped article.) The folded film may be drawn over the prow and, in its forward progress, becomes spread and flattened over that portion of the spreader which for convenience may be called the hull. A series of small rollers is positioned along the edges of the spreader to maintain the film in a taut and substantially wrinkle-free condition. To minimize the tension required to draw the film over the spreader and to avoid, so far as is possible, the development of static electric charge due to friction between the film and the spreader, means are provided for delivering one or more streams of air between the outer surface of the spreader and the film passing over it. The resulting air cushion between the film and the spreader permits the film to move rapidly without wrinkling and without developing an objectionable amount of static charge.

The apparatus will be described in greater detail and may be understood more readily by reference to the accompanying drawing, wherein Fig. 1 is a longitudinal elevation of the apparatus of the present invention; Fig. 2 is a plan view of the same apparatus; Fig. 3 is a partial vertical section taken along the line 3—3 of Fig. 2; Fig. 4 is a vertical section taken along the line 4—4 of Fig. 2; and Fig. 5 is a perspective view showing the folded film approaching the spreader device leading to the heat treating apparatus.

The new apparatus includes a spindle 7 for carrying a roll of film 8 to be treated, connected by a sprocket 9, a chain 10, and a sprocket 11 to a slip clutch 12 acting as a brake and mounted on a stationary shaft 13. A spreader 14 to be described more fully, and the heat treating tanks 15 together with their associated rollers will be referred to hereinafter. The clutch 12 adjusts the tension on the roll of film 8 as the film is being pulled off the roll, and also prevents any over-travel of the film 8 when operation is stopped for any reason. The spread and flattened film 8 is received by a pair of rubber pinch rollers 16 from which the film passes under polished steel roll 17 and over roll 18. The latter rolls serve as guides and as means for maintaining tension on the moving film. A second set of guide rollers 19 and 20 is provided to minimize any tendency to slip which the film 8 may exhibit as it enters the first heat treating bath 15. Thereafter the path of the film which has passed over roll 20 follows a course under rolls 21, dipping beneath the heating liquid 22, and thence over roll 23 in each of the four or more heat treating compartments 15. After film 8 has passed beneath rolls 21 in the last compartment in the series, it is passed between compressive pressure rolls 24 and proceeds to a wind-up roll or other storage means, not shown. Continuous flow of film through the apparatus at the desired rate is maintained at each stage through a series of individually adjustable drives by which rolls 23 are caused to turn at a speed just sufficient to forward the film 8 being withdrawn from the preceding tank 15 to the next such compartment. In a practical arrangement of the present apparatus a single motor 25 may be used as the drive for a plurality of variable speed gear reducers 26 each of which is connected, as through a chain 27, with one of the upper tier of polished rollers 20 and 23. Chain 27 typically passes around sprocket 28 mounted on an extension of the axis of roll 23 and the preceding rolls 21 are driven at the same rate by means of chain 29 which passes about sprocket 30 at the opposite end of roll 23 and a similar sprocket 31 on the same side of the apparatus, mounted on a short drive shaft 32 which constitutes the axis for rotation of gear 33 mounted so as to drive gears 34 which are concentric with each of the submerged rolls 21 (Fig. 4). Motor 25 may also be used conveniently to drive the final set of compressive rolls 24, suitably through belts 35 and appropriate pulleys 36 or other speed reducing means. Compressive rolls 24 may be maintained under pressure by any suitable means, and to illustrate this principle there is shown in Fig. 1 a hydraulic piston device 37 which can accomplish the desired purpose. It is to be understood, of course, that the practical pressure means employed is not critical and that rolls 24 may be maintained in compressive relationship by any of several types of auxiliary equipment such as the springs commonly used on wringer rolls in the well-known home laundry equipment.

The heating liquid 22 in each of compartments 15 may be heated to an independently selected temperature in that compartment either by means of steam passing at a controlled pressure through pipes 38 immersed in liquid 22 or by means of independently controlled immersion heaters beneath the surface of that liquid. Thus, both the temperature of the heating bath and the rate of travel of film through each bath are subject to individual control. It is to be understood that, instead of the pair of partially submerged rollers 21 in each of the heat treating compartments, a single such roll may be employed.

An especially desirable apparatus for use with this invention is the particular type of spreader device 14 illustrated in Figs. 1 and 2. The folded film is withdrawn from its supply roll mounted on spindle 7 and passes between guide rolls 39 thence over the pointed prow 40 of spreader 14. This wedge-like point 40 is continuous with a broad and relatively flat body portion 41 so that film 8, in passing thereover, gradually loses its fold and assumes a position in a single plane. To minimize friction between film 8 and spreader 14, air is delivered under pressure through tube 42 at a point just ahead of prow 40 and in a manner to open the folded film 8 as it approaches the spreader (Figs. 1 and 5). This results in a billowing effect illustrated in the plan view of Fig. 2 and minimizes contact between the film and the spreader. To control such billowing and to maintain a proper positional relationship between film 8 and spreader 14, there is provided a frame 42 mounted over spreader 14 carrying a plurality of pairs of shafts 43 each bearing at its extremity a small roller 44. Shafts 43 are so bent as to bring their supported rollers 44 down upon the surface of film 8, holding the film from slipping laterally during its lengthwise progress over spreader 14.

The rate of rotation of each of the drive mechanisms at each point where it is effective in the movement of film through the apparatus is controlled so that the film is kept taut and wrinkle-free but is not subjected to positive stretching. Compressive rolls 24 are driven at a rate just sufficient to keep the treated film in motion as it leaves the last treating zone. Since the result of treatment of an oriented film of a crystalline polymeric vinylidene chloride composition in the apparatus here described is a considerable shrinkage of that film, the linear rate of discharge of the treated film passing through rolls 24 is necessarily less than the linear rate of feed of the untreated film 8 from the supply roll mounted on spindle 7. Numerous commercially available types of variable speed drives and gear reducers are well-known and are adaptable to use in the present apparatus.

The problem for which the herein described machine was devised concerns the preshrinking of crystalline vinylidene chloride copolymer film. There are many other types of film which exhibit an undesirable tendency to shrink when exposed to heat when such films are in the condition of orientation in which they are originally produced. It is believed apparent that the present apparatus is sufficiently flexible in its operating conditions so that it may be employed in the preshrinking and thermal stabilization of any such film.

The dimensions of the apparatus are not critical since it is possible to shorten or prolong the residence time of a film being treated in the series of heat treating baths so as to accomplish the required amount of shrinkage. The length of each of the series of rolls 21 and 23 must clearly be sufficient to allow the once folded film to pass over those rolls at its full width without impinging upon the walls of the treating vessel or the drive gears mounted at the ends of the submerged rolls.

We claim:

Apparatus for preshrinking oriented film of a crystalline polymeric vinylidene chloride composition, comprising: means for feeding the flattened film continuously and in essentially wrinkle-free condition, a series of at least four compartments of a width greater than that of the film to be treated, a liquid inert to the film in each of said compartments, means in each compartment for heating the liquid therein to an independently selected temperature; at least one smooth guide roll mounted to dip beneath the liquid level in each said compartment with its axis transverse to the direction of travel of the film; a smooth-surfaced driven roll located above each of the partitions separating said compartments, each with its axis transverse to the direction of travel of the film, each of said latter rolls being connected with and driven by an individual variable-speed drive mechanism; a pair of compressible squeeze rollers beyond the last compartment in the direction of travel of the film; and means for driving said compressible rollers at a rate to maintain sufficient tension on a film being treated to draw it through the apparatus and to keep it free from wrinkles.

WALTER A. KLEIN.
ROBERT R. TRULL.
EDWARD V. DETTMER.

REFERENCES CITED

The following references are of record in the file of this patent:

UNITED STATES PATENTS

| Number | Name | Date |
| --- | --- | --- |
| 544,517 | Peyton | Aug. 13, 1895 |
| 2,039,335 | Nall | May 5, 1936 |
| 2,114,758 | Young | Apr. 19, 1938 |
| 2,320,115 | Young | May 25, 1943 |
| 2,397,149 | Land | Mar. 26, 1946 |